United States Patent [19]
Howarth et al.

[11] Patent Number: 5,888,428
[45] Date of Patent: *Mar. 30, 1999

[54] METHODS FOR GENERATING RESIDUAL DISINFECTANTS DURING THE OZONIZATION OF WATER

[75] Inventors: Jonathan N. Howarth, Atlanta, Ga.; Julie A. McKeown; Rodney H. Sergent, both of West Lafayette, Ind.

[73] Assignee: Great Lakes Chemical Corporation, West Lafayette, Ind.

[ * ] Notice: The term of this patent shall not extend beyond the expiration date of Pat. No. 5,264,136.

[21] Appl. No.: 723,043

[22] Filed: Sep. 30, 1996

Related U.S. Application Data

[63] Continuation of Ser. No. 432,200, filed as PCT/US93/10494 Nov. 1, 1993, abandoned, which is a continuation-in-part of Ser. No. 969,023, Oct. 30, 1992, Pat. No. 5,264,136.

[51] Int. Cl.$^6$ .............................. C09K 15/22; C02F 1/78; A61L 2/18
[52] U.S. Cl. .................. 252/403; 252/400.62; 252/401; 210/753; 210/755; 210/760; 210/764; 422/35; 422/37
[58] Field of Search ..................... 210/764, 673, 210/755, 758, 756, 760, 754, 753; 252/400.62, 401, 403, 405; 422/35, 37

[56] References Cited

U.S. PATENT DOCUMENTS

| | | | |
|---|---|---|---|
| 2,580,809 | 1/1952 | Marks et al. | 210/23 |
| 3,326,747 | 6/1967 | Ryan et al. | 167/17 |
| 3,412,021 | 11/1968 | Paterson | 210/62 |
| 3,753,676 | 8/1973 | Halley | 71/67 |
| 4,053,403 | 10/1977 | Bachhofer et al. | 210/62 |
| 4,123,376 | 10/1978 | Gray | 252/99 |
| 4,235,599 | 11/1980 | Davis et al. | 8/108 |
| 4,256,728 | 3/1981 | Nishino et al. | 422/4 |
| 4,329,431 | 5/1982 | Youssef | 435/253 |
| 4,453,953 | 6/1984 | Tanaka et al. | 55/163 |
| 4,537,697 | 8/1985 | Girard | 252/90 |
| 4,560,766 | 12/1985 | Girard et al. | 548/311 |
| 4,659,359 | 4/1987 | Lorenz et al. | 71/67 |
| 4,677,130 | 6/1987 | Puzig | 514/389 |
| 4,745,189 | 5/1988 | Lee et al. | 544/221 |
| 4,909,956 | 3/1990 | Webber | 252/187.34 |
| 4,935,153 | 6/1990 | Favstritsky et al. | 210/755 |
| 4,966,775 | 10/1990 | Donofrio et al. | 424/661 |
| 5,130,033 | 7/1992 | Thornhill | 210/754 |
| 5,264,136 | 11/1993 | Howarth et al. | 210/754 |
| 5,332,511 | 7/1994 | Gay et al. | 210/755 |
| 5,352,369 | 10/1994 | Heinig | 210/760 |
| 5,464,636 | 11/1995 | Hight et al. | 424/661 |
| 5,478,482 | 12/1995 | Jones et al. | 210/753 |
| 5,565,109 | 10/1996 | Sweeny | 210/755 |

OTHER PUBLICATIONS

D. Pacik and R.G. Rice, "The Hydrozone–Kompakt Process—A New Method for Treatment and Disinfection of Swimming Pool and Bathing Water," *Ozone Sci. & Eng.*, 31(1), 63–90, 1991.

W.R. Haag, J. Hoigne and H. Bader, "Improved Ammonia Oxidation by Ozone in the Presence of Bromide Ion During Water Treatment,"; *Water Res.*, 18(9), 1125–1128, 1984.

W.R. Haag and Jurg Hoigne, "Ozonization of Bromide–Containing Waters: Kinetics of Formation of Hypobromous Acid and Bromate," *Environ. Sci. Technol.*, 17(5), 261–267, 1983.

(List continued on next page.)

*Primary Examiner*—Shean C. Wu
*Attorney, Agent, or Firm*—Woodard, Emhardt, Naughton Moriarty & McNett

[57] ABSTRACT

Methods and compositions for generating stable, residual disinfectants during the ozonization of water, comprising the carrying out the ozonization of water in the presence of bromide ions and an effective amount of a hypobromite ion scavenger possessing imide and/or amide functionality that preferentially converts hypobromite ions to biocidal, ozone-stable derivatives thereof to thereby suppress the catalytic decomposition reaction of ozone with hypobromite ions. The methods and compositions of the present invention are useful for water disinfection and algae control, generally.

5 Claims, 4 Drawing Sheets

OTHER PUBLICATIONS

Chemical Abstract of Japanese Patent No. 03,232,584, dated Oct. 16, 1991.
Chemical Abstract 112:62315; Jul. 11, 1989.
Chemical Abstract 119:79729; Mar. 18, 1993.
Chemical Abstract 119:146297; Jun. 13, 1993.
Chemical Abstract 92:158961; Dec. 5, 1979.
Chemical Abstract 80:112498; Dec. 7, 1971.

METHODS FOR GENERATING RESIDUAL DISINFECTANTS DURING THE OZONIZATION OF WATER

This application is a continuation of applicants' application Ser. No. 08/432,200, filed as PCT/US93/10494 Nov. 1, 1993, now abandoned, which is a continuation-in-part of U.S. patent application Ser. No. 07/969,023, filed Oct. 30, 1992 and issued Nov. 23, 1993 as U.S. Pat. No. 5,264,136.

BACKGROUND OF THE INVENTION

This invention relates generally to the ozonization of water for disinfection and algae control.

Ozonization of water for disinfection and algae control is well-established in Europe and Japan. The use of this method of water treatment is expected to expand worldwide, and particularly in the United States, because ozone ($O_3$) is considered to be an environmentally-friendly biocide that produces no hazardous by-products when used alone. The impending availability of economic and efficient ozone generating systems will increase the use of ozone in water treatment, generally.

More particularly, ozone is presently used in the treatment of recreational waters, such as swimming pool and spa waters, in the treatment of recirculating cooling water, and in the treatment of wastewater. In these applications however, ozone suffers some widely recognized limitations: it is unstable in water, and it is readily volatilized from water. Consequently, it is difficult for an ozone-based water treatment system to maintain a residual level of ozone, which is often necessary for effective disinfection. The traditional strategy that has been used to overcome these ozone limitations is to post-treat water that has been ozonized with a conventional chlorine method. Alternatively, to ensure a residual level of ozone in the bull of the water system, a high capacity ozone generator may be employed.

It has been recognized that the presence of the bromide ion ($Br^-$) in water that has been ozonized results in the formation of hypobromous acid (HOBr), which is a secondary oxidizing biocide. Since hypobromous acid is more persistent in water than ozone, the hypobromous acid confers residual disinfection. Therefore, when the bromide ion is present during ozonization of water the traditional post-treatment chlorine practice may be eliminated, along with the hazards associated with the storage and handling of chlorine or chlorinated chemicals.

Several papers have been published describing the interaction of ozone with the bromide ion, and many ozonization conditions have been considered, ranging from the ozonization of seawater (65 ppm $Br^-$ ion), to the ozonization of river water (10 ppb $Br^-$ ion). The kinetics and mechanism of the reactions of the bromide ion in the ozonization of water, and the potential for trihalomethane (THM) formation, have also been addressed.

The generally accepted mechanism for the interaction of ozone with the bromide ion has been provided by W. R. Haag and J. Hoigne, "Ozonization of Bromide-Containing Waters: Kinetics of Formation of Hypobromous Acid and Bromate," Environ. Sci. Technol., 17(5), 261, 1983; and W. R. Haag and J. Hoigne, "Kinetics and Products of the Reactions of Ozone with Various Forms of Chlorine and Bromine in Water," Ozone Sci. & Eng., 6, 103, 1984. Haag and Hoigne established that the reaction of ozone with the chlorine ion ($Cl^-$) is unproductively slow, but interesting chemistry was revealed with the bromide ion, which is summarized in FIG. 1.

Ozone oxidizes the bromide ion at a moderate rate, initially to hypobromous acid (HOBr), which only reacts further in its hypobromite ion ($OBr^-$) form with ozone. Two pathways were identified by Haag and Hoigne for further reaction of ozone with the hypobroinite ion:

$$O_3 + OBr^- \rightarrow 2O_2 + Br^- \quad (1)$$

$$2O_3 + OBr^- \rightarrow 2O_2 + BrO_3^- \quad (2)$$

The first reaction represents a catalytic decomposition of ozone with regeneration of the bromide ion, and the second reaction results in the formation of a highly undesirable bropnate ion ($BrO_3^-$) by-product that removes a bromide ion from tile cycle. Consequently, on prolonged ozonization, all the bromide ions materialize as bromate. One of the biggest problems facing the ozone-treatment of drinking water is that ozone reacts with naturally-occurring bromide ion ($Br^-$) to produce the highly undesirable bromate ion ($BrO_3^-$).

Both reactions (1) and (2) are a waste of ozone. Nevertheless, it is apparent that the addition of bromide ions to water that has been ozonized can result in the formation of hypobromous acid as a persistent oxidizing biocide.

In practice, the moderate rate of reaction between ozone and the bromide ion means primary disinfection is accomplished by ozone, and secondary, or residual, disinfection by hypobromous acid, generated when the water acquires low microbial populations. This property of "internal generation" of a residual disinfectant renders post-ozonization chlorine treatment obsolete, and permits the use of smaller, and thus cheaper, less energy intensive, ozone generators for a particular ozonation application.

The ozone/bromide ion system has been in use in Europe for swimming pool water treatment. There is also a report of a German recirculating cooling water tower that has become more efficient when bromide ion is deliberately added to the ozonated cooling water. In these known applications, it would appear that the ozone-loss reactions (1) and (2) are tolerated, and that bromate production is not an issue.

SUMMARY OF THE INVENTION

Although ozone/bromide ion chemistry is well understood in the prior art, heretofore no one has discussed the introduction of an additive specifically selected to intercept and scavenge the $OBr^-$ ion to completely suppress destructive consumption of ozone in the ozone-loss reactions (1) and (2).

According to the present invention, ozone can generate its own residual, and more persistent, oxidizing biocide for the treatment of water, generally, by the introduction to water treatment operations that employ ozone, alone, of small amounts of the bromide ion ($Br^-$) and a hypobromite ion ($OBr^-$) scavenger possessing imide and/or amide functionality that is capable of intercepting the hypobromite ion ($OBr^-$) and forming biocidal derivatives thereof that are stable to ozone attack. The most preferred scavengers in work completed to date have been dimethylhydantoin (DMH) or succinimide (SI). The addition of such a scavenger serves to make more effective use of the ozone charged to the water to be treated by effectively suppressing the catalytic decomposition reaction (1) of ozone with the hypobromite ion, and by preventing bromide ion loss to bromate ions ($BrO_3^-$) via reaction (2), which is not biocidally useful. The moderate rate of reaction between ozone and the bromide ion ($Br^-$) means primary disinfection is accomplished by ozone, and secondary, or residual, disinfection by the resulting, residual, biocidal hypobromite ion OBr⁻ derivative, generated when the water acquires low microbial populations. On performing biocidal action, the bromide ion and the scavenger are regenerated, so the cycle is reinitiated on subsequent ozone contact.

Also according to the present invention, in the ozone-treatment of drinking water during which ozone reacts with naturally-occurring bromide ion (Br⁻) to produce the highly undesirable bromate ion ($BrO_3^-$) the introduction of small amounts of the hypobromite ion (OBr⁻) scavengers of the present invention completely suppress this undesirable reaction. Ozonation of drinking water is commonly accompanied by Granular Activated Carbon (GAC) post-treatment, which will remove the preferred hypobromite ion (OBr⁻) scavengers at the useful low level concentrations.

One embodiment of the present invention is a method for generating stable, residual disinfectants during the ozonization of water, comprising the step of carrying out the ozonization of water in the presence of bromide ions and an effective amount of a hypobromite ion scavenger possessing imide and/or amide functionality that preferentially converts hypobromite ions to biocidal, ozone-stable derivatives thereof to thereby suppress the catalytic decomposition reaction of ozone with hypobromite ions.

Another embodiment of the present invention is a method for water disinfection and algae control comprising the step of charging the water with ozone in the presence of bromide ions and an effective amount of a hypobromite ion scavenger possessing imide and/or amide functionality that preferentially converts hypobromite ions to biocidal, ozone-stable derivatives thereof to thereby suppress the catalytic decomposition reaction of ozone with hypobromite ions.

Yet another embodiment of the present invention is an additive composition for generating secondary disinfectants during the ozonization of water, comprising an admixture of bromide ions and a hypobromite ion scavenger possessing imide and/or amide functionality that preferentially converts hypobromite ions to biocidal, ozone-stable derivatives thereof to thereby suppress the catalytic decomposition reaction of ozone with hypobromite ions.

Yet another embodiment of the present invention is a method for drinking water disinfection comprising the step of charging water containing naturally-occurring bromide ions with ozone and an effective amount of a hypobromite ion scavenger possessing imide and/or amide functionality that preferentially converts hypobromite ions to biocidal, ozone-stable derivatives thereof to thereby suppress the catalytic decomposition reaction of ozone with hypobromite ions.

Bromine displays excellent biocidal properties at elevated pH (where ozone is unstable), and is less prone to volatilization from the water than either chlorine or ozone. Therefore, the present invention will permit the use of smaller capacity, and thus cheaper, less energy intensive, ozone-generators for a given application.

Both of the preferred scavenger additives of the present invention, DMH and SI, display appreciable water solubility, making it possible to formulate a solution with a source of bromide ions (such as NaBr) for simple delivery to water systems. On a cost basis, DMH is the most preferred material.

A principal object of the present invention is the efficient generation of a stable, residual disinfectant in recreational waters, cooling waters, and wastewaters in treatment operations that employ ozone.

Another principal object of the present invention is the suppression of the production of the highly undesirable bromate ion ($BrO_3^-$) during the ozonation of water in the presence of naturally-occurring or added bromide ion (Br⁻).

Related objects and further advantages of the present invention will be evident from the following description.

DESCRIPTION OF THE PREFERRED EMBODIMENTS

For the purposes of promoting an understanding of the principles of the invention, reference will now be made to the preferred embodiments and specific language will be used to describe the same. It will nevertheless be understood that no limitation of the scope of the invention is thereby intended, such alterations and further modifications in the preferred embodiments, and such further applications of the principles of the invention as illustrated therein being contemplated as would normally occur to one skilled in the art to which the invention relates.

Figure 1:
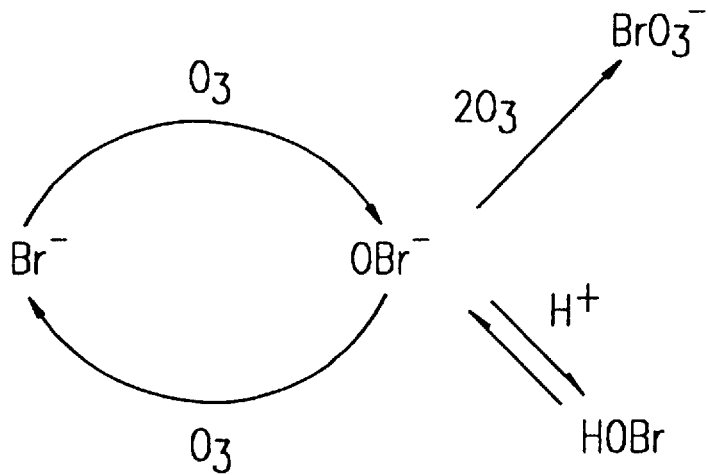
FIG. 1 is an illustration of the generally accepted mechanism for the reaction of ozone with the bromide ion, and represents the prior art.

The Haag and Hoigne reaction mechanism, illustrated in FIG. 1, was verified experimentally and was determined to be highly pH dependent. At elevated pH, hypobromous acid (HOBr) is significantly dissociated to hypobromite ions (OBr⁻) ($pK_a$ HOBr is 8.4) and more ozone is consumed in the loss reactions (1) and (2), above. For example, at pH 9.0 (typical for a cooling tower), over 40% of the ozone charged to the water is consumed in reactions (1) and (2). The key, therefore, is to remove OBr⁻ from the system and to form a biocidally-useful derivative compound. In effect, OBr⁻ is intercepted and scavenged before it has a chance to react further with ozone.

It is known from the literature that the reaction of free-amines with HOBr/OBr⁻ solutions results in very rapid formation of N-bromamines, which possess biocidal activity. However, experiments completed to date confirmed other published data that showed that N-bromamines are rapidly attacked by ozone. On the other hand, there appeared to be little published information regarding the solution kinetics of HOBr/OBr⁻ solutions including a scavenger additive capable of forming N-bromo derivatives of OBr⁻, and more specifically an imide or hydantoin scavenger additive, and certainly no data regarding the ozone stability of the resulting N-bromo derivatives.

Figure 4:
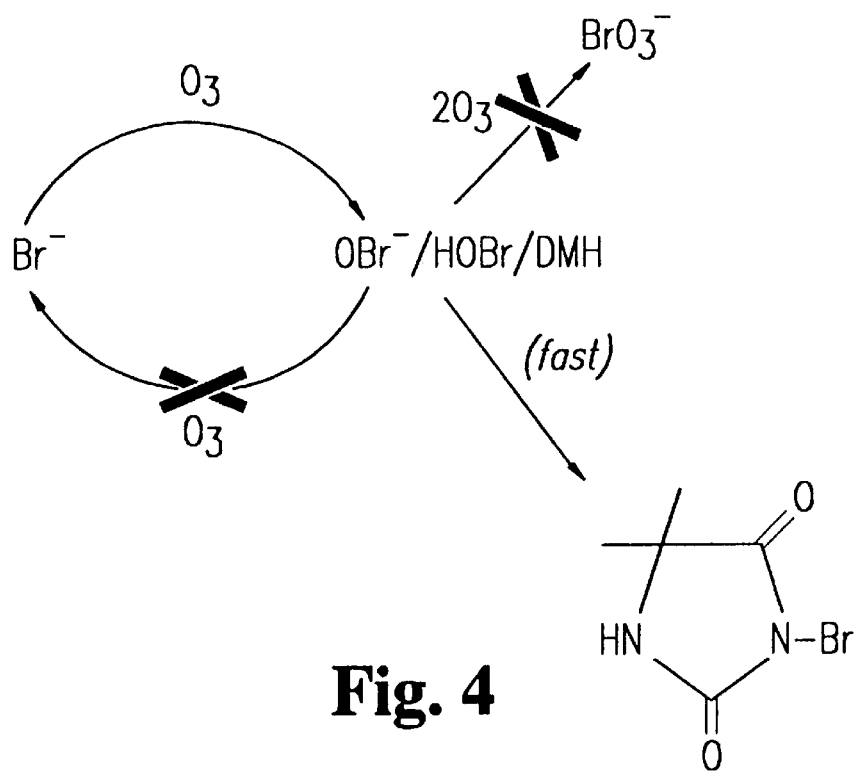
FIG. 4 is an illustration of the mechanism for the reaction of ozone with the bromide ion in the presence of DMH.

Experiments conducted to date have shown that under typical ozonization conditions, the reaction between ozone-generated OBr and 5,5-dimethylhydantoin (DMH) or succinimide (SI) is much faster than the reactions (1) and (2) that consume ozone detrimentally. As a result, particularly over the pH range 7.0–9.0, it has been observed that effectively all of the ozone charged to a water treatment system materializes as a stable, biocidal form of bromine. FIG. 4 best describes the chemistry of the ozone/bromide system in the presence of DMH. This illustrated mechanism of the preferred embodiment of the invention operates at DMH or SI levels as low as about 5 ppm, and bromide ion levels as low as about 5 ppm.

Recognizing that ozonization of water containing bromide ion can result in the generation of hypobromous acid as a residual oxidizing biocide, experiments conducted to date have examined the chemistry of such a system under conditions relevant to the recreational and. cooling water industries, specifically. Thus, ozone (~1 mg/L) was charged to water spiked with bromide ion (5 mg/L). The amount of ozone consumed destructively via reactions (1) and (2), above, and constructively in generating an oxidized form of bromine was measured over the pH range 7.0–9.0. The effect of adding DMH and SI to influence the chemistry of the system was studied. Finally, the reaction kinetics were probed in order to define the time corresponding to complete disappearance of ozone in the presence of the bromide ion.

EXPERIMENTAL EXAMPLES

Ozonization Procedure

An American Ozone Systems Inc. ozone-generator was used in conjunction with an air compressor. Sample solutions were placed in a 12" contact tower and the ozone-laden air was bubbled in through a coarse frit located at the bottom. Buffer solutions were freshly prepared with de-ionized water. To eliminate ozone demand arising from microbial or organic contaminants, the solutions were contacted for 2 minutes with ozone, which was allowed to decay naturally prior to commencing experiments. Typically, solutions (500 mL) were charged with ozone to a level around 1 mg/L with a 30 second contact time. For some samples, including all those containing the bromide ion, the solutions were immediately removed from the contact tower and were carefully poured into a glass vessel so as to fill it to the brim (no headspace). The vessel was then sealed and placed in the dark for one hour prior to analysis.

Analyses

Iodometric titration was used for the determination of ozone and oxidizing forms of bromine. Following a one hour incubation period in the dark to ensure the complete absence of ozone (confirmed by blank experiments), samples containing the bromide ion (250 mL) were adjusted to pH 4 with acetic acid, excess KI was added, and the $I_2$ liberated was titrated with 0.0099M $Na_2S_2O_3$. On the other hand, the ozone in bromide ion-free samples (250 mL) was usually analyzed immediately after contact to minimize losses through natural decay and volatilization. The bromide ion concentrations, before and after ozone contact/incubation, were measured using a bromide ion Ion-Selective Electrode (ISE) (Orion 94-35) with a double-junction Ag/AgCl reference (Orion 90-02). Before use, the electrode was calibrated against standard bromide ion solutions to check the 57 mV/decade Nernstian response. Bromine unaccounted for by the sum of the iodometric and ISE measurements was assumed to be in the form of the bromate ion.

Kinetic Measurements

All kinetic measurements were performed with a Hitachi 150-20 dual-beam spectrophotometer and data processor. Quartz cells (path length 5 cm) were filled with ozonized test solutions and capped. The reactions were followed by monitoring the ozone absorbance at 258.6 nm with time.

Ozonization of Bromine-Containing Waters

Figure 3:
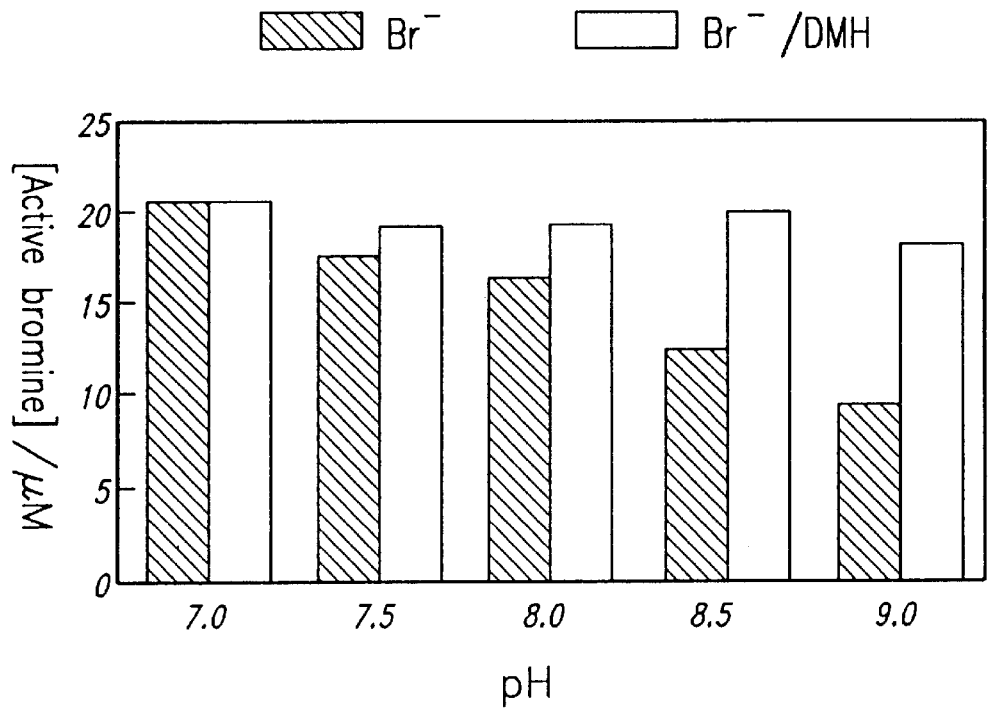
FIG. 3 is a chart illustrating the amount of oxidizing bromine generated on ozonization of a 5 mg/L bromide ion solution in the presence and absence of DMH.

To establish the amount of ozone charged to the bromide ion test solutions, blank experiments were performed at each pH. Immediately after contact in the tower, the ozonized buffer was quickly introduced to a flask containing KI crystals and acetic acid for pH adjustment. Therefore, the ozone was quenched, and the $I_2$ liberated was titrated with standardized $Na_2S_2O_3$. FIG. 3 represents the "instantaneous" ozone-charge at each pH. Also shown in FIG. 3 is a tabulation of measures of ozone after a one hour incubation in the dark. It can be seen that in each case, no ozone was present.

The buffers were spiked with 5 mg/L bromide ion and charged with ozone in the usual fashion. After incubation in the dark, to ensure the complete absence of ozone, the oxidizing bromine content (HOBr/OBr⁻) of the samples was determined iodometrically, and the bromide ion measured by ISE.

Considerably less HOBr/OBr⁻ was generated as the solution pH increased. According to Haag and Hoigne, supra, this can be explained by the destructive consumption of ozone by reaction with OBr⁻ ions. The degree of ionization of HOBr to OBr⁻ varies markedly over the pH range employed here ($pK_a$ HOBr is 8.4). The key to efficient ozone utilization is to intercept OBr⁻ by rapid formation of a biocidally-useful compound that is resistant to further attack. N-bromamines are also oxidizing biocides. The reaction of free-amines with OBr⁻ ion to form N-bromamines is reported to be up to $10^6$ times faster than reactions causing ozone destruction. However, experiments with all candidate compounds confirmed other studies that show N-bromamines are rapidly decomposed by ozone.

On the other hand, there appeared to be little published information regarding the solution kinetics of OBr⁻ ion solutions with hydantoins, and no data about the ozone-stability of their N-bromo derivatives. N-halogenated hydantoins are commercially-available oxidizing biocides. Therefore, buffer solutions containing 5 mg/L bromide ion and 5 mg/L 5,5-dimethylhydantoin (DMH) were ozonized, as before.

The amount of oxidizing bromine generated on ozonization of a 5 mg/L bromide ion solution in the presence and absence of DMH is shown in the graph of FIG. 3. As noted earlier, it can be seen that on ozonization of buffer solutions containing only the bromide ion, as the pH increases, less bromide was generated. The trend closely parallels the degree of ionization of HOBr to OBr⁻ over the same pH range ($pK_a$ 8.4) and evidences the validity of the Haag and Hoigne assertion that ozone reacts only with OBr⁻. However, in the presence of DMH, the situation changed dramatically. At pH>8.0, considerably more of the ozone charged to the system materialized as an oxidizing form of bromine. It is clear that the rate of N-bromohydantoin formation was far greater than reactions causing destructive consumption of ozone. Unlike the situation with N-bromamine compounds, the N-bromohydantoin is stable to ozone degradation. The schematic in FIG. 4 represents a modified version of the Haag and Hoigne mechanism in the presence of DMH.

Figure 2:
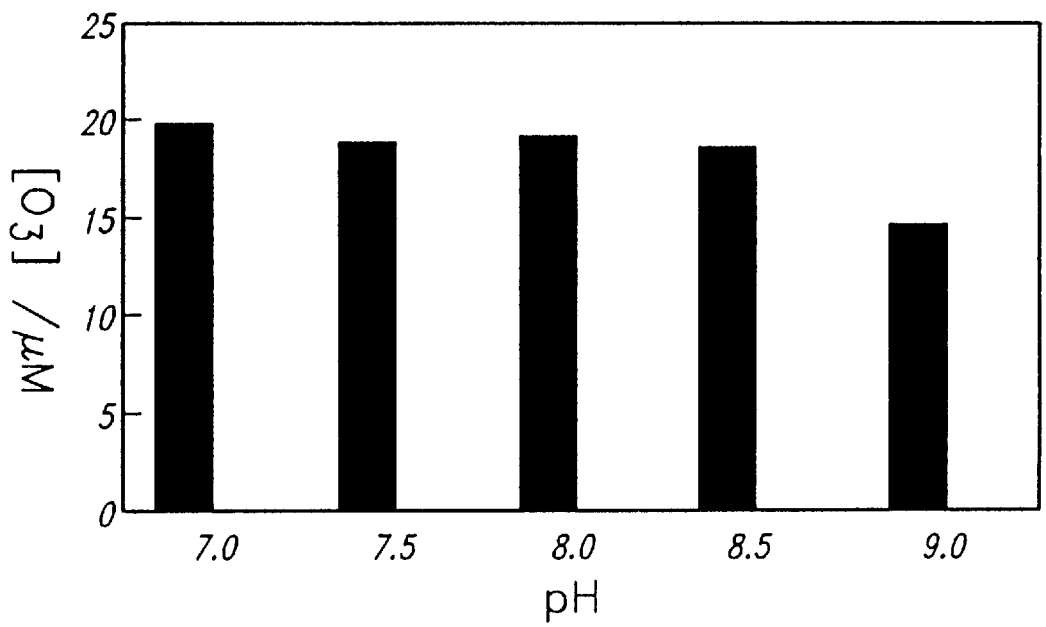
FIG. 2 is a chart illustrating the "instantaneous" ozone charges over the pH range 7.0 to 9.0, and the measures of ozone remaining after one hour incubation in the dark.
Figure 6:
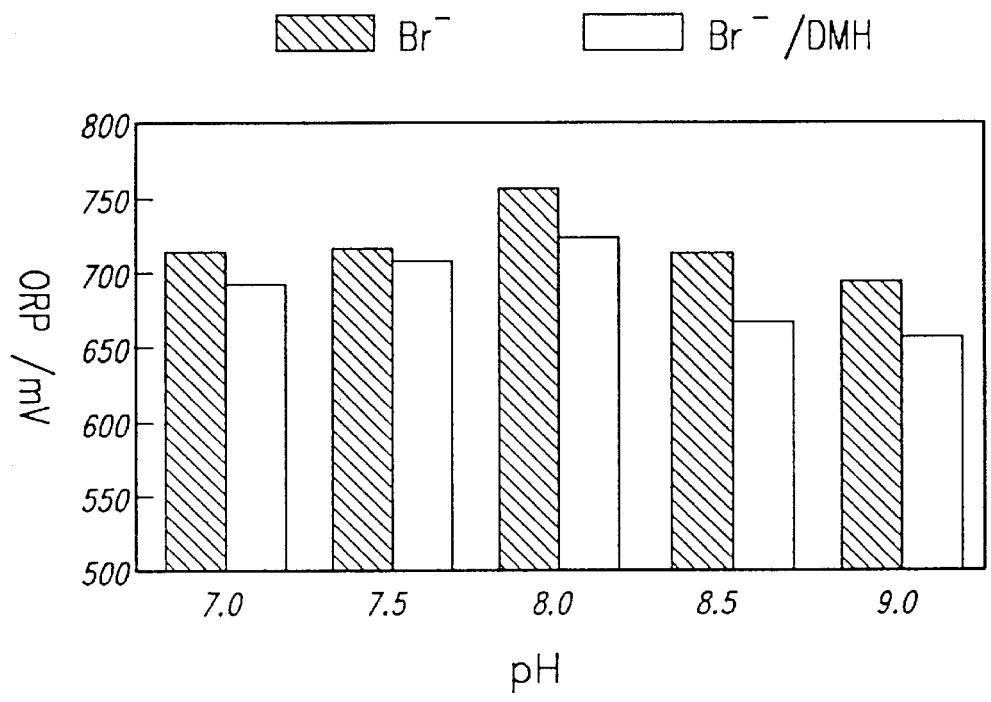
FIG. 6 is a chart illustrating oxidation-reduction potentials after ozonization for samples with and without DMH.

Closer inspection of FIGS. 2 and 3 reveals an interesting feature. Especially towards higher pH, it would appear that when DMH is introduced, more bromide is produced than stoichiometrically possible given the ozone charge. FIG. 6 gives the percentage of "instantaneously-measured" ozone that was converted to active bromine in the presence and absence of DMH. The pH dependency of the system is exemplified again. For example, at pH 9.0, it appears that 126% of the instantaneously-measured ozone is converted to active bromine in the presence of DMH, whereas only 68% was consumed in this fashion when DMH was absent. Obviously, the actual ozone charge at elevated pH is underestimated due to decay during contact and sampling. Although experiments completed to date do not permit accurate assessment of the ozone charged to buffer solutions of pH>8.0 containing the bromide ion, far more can materialize as an oxidizing form of bromine when DMH is present. In fact, if DMH is absent, the presence of the bromide ion in ozonized waters might be detrimental, especially towards higher pH values where the ozone is consumed in destructive reactions with the $OBr^-$ ion.

Figure 5:
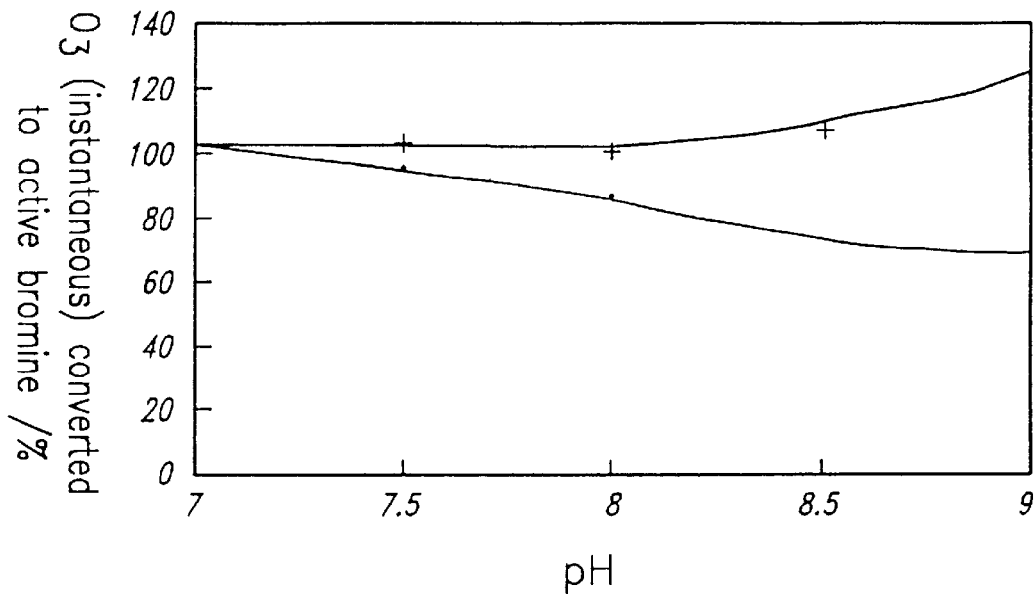
FIG. 5 is a graph illustrating the percent of instantaneously measured ozone that was converted to active bromine in the presence and absence of DMH.

Table I lists the data used in the construction of FIGS. 2, 3 and 5. The data in parentheses express the results in terms that would be used in practical applications.

TABLE I

Oxidizing Bromine Generated by Ozonization of $Br^-$ Ion Solutions in the Presence and Absence of DMH. The Effect of pH.

| pH | $O_3$-charge /µM (mg/L $O_3$) | 5 mg/L $Br^-$ ion /µM (mg/L $Br_2$) | 5 mg/L $Br^-$ ion + 5 mg/L DMH /µM (mg/L $Br_2$) |
|---|---|---|---|
| 7.0 | 20.0 (0.96) | 20.6 (3.3) | 20.6 (3.3) |
| 7.5 | 18.5 (0.89) | 17.5 (2.8) | 19.3 (3.1) |
| 8.0 | 18.9 (0.91) | 16.2 (2.6) | 19.3 (3.1) |
| 8.5 | 18.3 (0.88) | 12.5 (2.0) | 20.0 (3.2) |
| 9.0 | 14.6 (0.70) | 10.0 (1.6) | 18.1 (2.9) |

Oxidation-Reduction Potential Measurements

Further evidence of the rapid formation of N-bromohydantoins during ozonization of water containing the bromide ion and DMH comes from Oxidation-Reduction Potential (ORP) measurements taken on the respective solutions after ozonation/incubation. FIG. 6 shows that despite possessing higher concentrations of oxidizing bromine (see Table I), samples containing DMH consistently registered a lower ORP than their counterparts. This indicates that the bromine species is highly complexed to the DMH molecule.

The Influence of the Nitrogenous Additive

A series of experiments was performed in which buffer solutions (pH 8.5) containing 5 mg/L bromide ion were ozonized (~1 mg/L O3) in the presence of 5 mg/L of different nitrogen additives. The compounds were selected on the basis of (1) ability to form N-bromo derivatives, and (2) precedent use in water treatment applications.

After leaving the ozone-treated solutions for one hour in the dark, the oxidizing bromine content was determined. The performance of the additive was rated according to whether more, less, or the same amount of bromine was generated when the additive was added to the system. Table II summarizes the findings.

TABLE II

Results Using Different Nitrogenous Additives

| Structure | | Performance Rating |
|---|---|---|
| [Dimethylhydantoin structure] | Dimethylhydantoin | More bromine |
| [Succinimide structure] | Succinimide | More bromine |
| [Dimethadione structure] | Dimethadione | Same bromine |
| [Cyanuric acid structure] | Cyanuric acid | Same bromine |
| [Glycoluril structure] | Glycoluril | Same bromine |
| $HO-CH_2-CH_2-NH_2$ | Ethanolamine | No bromine |
| $NH_2-SO_3H$ | Sulphamic acid | No bromine |

Of the candidate compounds tested, only succinimide behaved like DMH at levels as low as 5 mg/L, and more bromine was ozone-generated when it was introduced. Despite the structural similarity of cyanuric acid, glycoluril, and dimethadione, these compounds had no apparent effect on the system at the low 5 mg/L level, indicating sluggish formation of their N-bromo derivative at this low concentration. All of these compounds are believed to work at higher concentrations, however, because the rate of N-bromination is a key factor. Since the reaction is second order, increasing the concentration of these compounds speeds the process to intercept $OBr^-$ before it has a chance to react with ozone.

For the final two candidates in Table II, no bromine was formed at all. Clearly, the presence of the free-amine groups led to the formation of N-bromamines, which consume ozone in rapid degradation reactions.

DMH and SI represent the preferred $OBr^-$ ion scavenger additives to date, but nitrogen compounds capable of forming biocidal N-bromo derivatives, other than those with free $NH_2$ groups (the N-brormamine is rapidly attacked by ozone), and having $PK_a$ in the range of about 6–10, would also be useful as scavenger additives of the present invention. More generally, additives containing imide and/or amide functionality would function like DMH and SI to scavenge OBr⁻ ion, provided they were present at high enough concentrations. Examples of such halo-compounds that would be useful as scavenger additives in the present invention include methylethylhydantoin (MEH), hydantoin, glycoluril, and 4,4,5,5-tetramethyl-2-imidazolidinone.

Dynamics of Ozone Decomposition in Bromide Solutions

Figure 7:
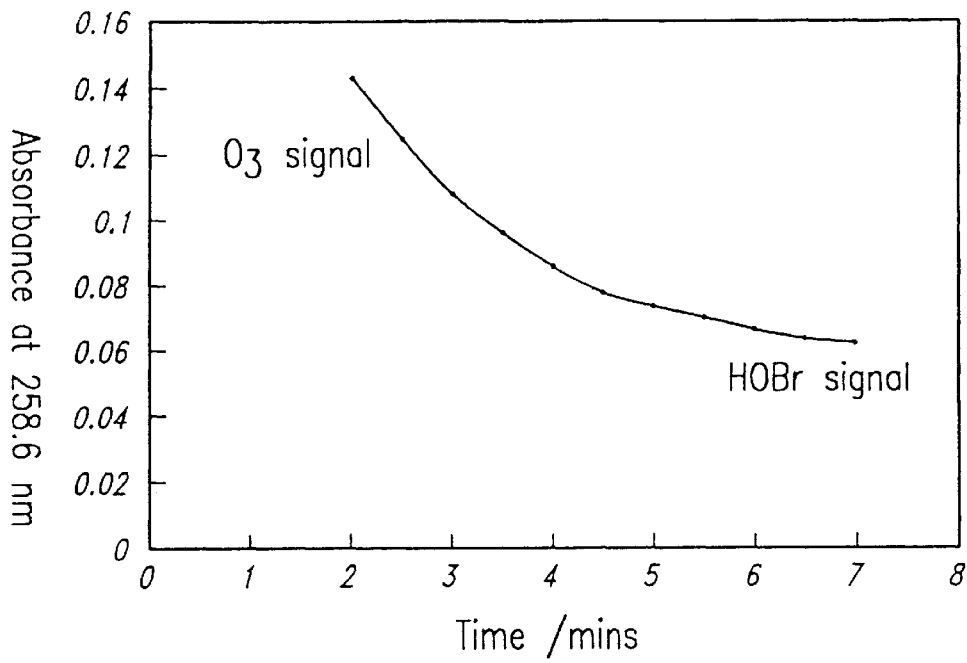
FIG. 7 is a graph illustrating rapid ozone decomposition over time after ozonization.

The decomposition of ozone in the presence of 5 mg/L bromide ion was followed by measuring the UV absorbance at 258.6 nm. Dimethylhydantoin (DMH) was excluded due to the strong carbonyl absorption in this region. Ozone-generated hypobromous acid is also UV-active and obscures the ozone absorbance somewhat. However, soon after ozonization there was a rapidly decaying response, signalling mainly ozone decomposition, followed by an attenuated region signalling complete ozone depletion and the presence of hypobromous acid, as shown in FIG. 7, which is for a pH 7.5 buffer solution charged with ~1 mg/L ozone. An estimate of the ozone decomposition time can be obtained by extrapolation. The trend as a function of pH is given in FIG. 8.

Figure 8:
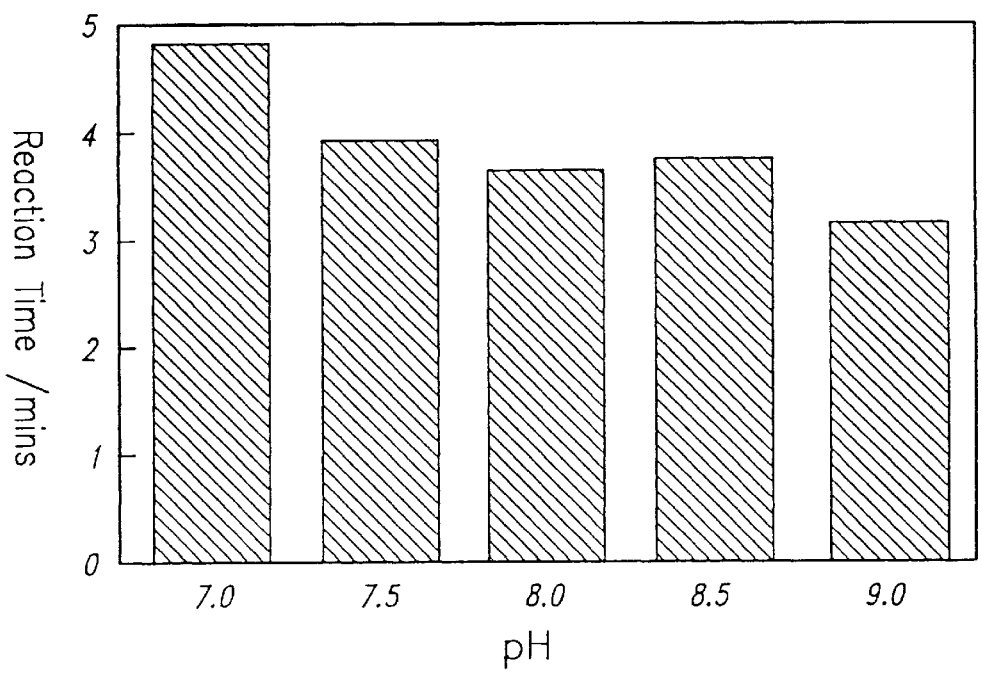
FIG. 8 is a chart illustrating estimated ozone decomposition time after ozonization, as a function of pH.

It can be seen that the overall pattern implies an accelerated decomposition of ozone with increasing pH, a feature consistent with the increasing significance of destructive reactions with OBr⁻. FIG. 8 indicates that when Br⁻ ion is present, ozone exists for 3–5 minutes. The practical importance of this finite lifetime is significant. It means that primary disinfection is accomplished by ozone and secondary/residual disinfection by the N-bromohydantoin, generated when the water, acquires low microbe populations.

It will be apparent from the foregoing description and experimental examples that the present invention provides improved compositions and methods for disinfecting ozone-based water treatment systems. These compositions and methods are applicable to a wide range of ozonated water treatment systems, including recreational water (swimming pools, whirlpool baths, hot tubs, etc.), industrial water (cooling towers, recirculating water systems, etc.), wastewater treatment applications, and drinking water treatment applications. The present invention is not pH dependent, although it has its greatest application in disinfecting waters having a pH of about 4 to 9, and particularly in the range of about 7 to 9.

The invention contemplates the addition of a hypobromite ion scavenger compound that is capable of preferentially forming a biocidal, ozone-stable derivative thereof to water that is being treated with ozone in the presence of bromide ions for purposes of disinfection and/or algae control. The bromide ions may be naturally-occurring or may be provided from a variety of sources compatible with the particular water treatment system, and many such source compounds are well known in the art. Such bromide ion sources may include NaBr, aqueous HBr acid, $CaBr_2$, KBr, LiBr, etc., with NaBr being most preferred as a safe, relatively inexpensive and readily available source of bromide ions. For typical water treatment systems, bromide ions are present at a level of at least about 0.5 ppm, and preferably at least about 5 ppm. The concentration of bromide ions may be as high as 20 ppm or more, but efficacy above that provided at levels of about 100 ppm are usually not required, or cost justified.

The hypobromite ion scavenger of the present invention preferrably possesses imide and/or amide functionality that is capable of interception OBr⁻ ions and preferentially forming biocidal, ozone-stable derivatives thereof. The most preferred scavenger to date has been a hydantion or succinimide in an amount sufficient to preferentially convert hypobromite ions to ozone-stable, biocidal, N-bromo derivatives thereof, thereby suppressing the catalytic decomposition reaction of ozone with hypobromite ions. The amount of hydantion or succinimide will depend on the water being treated, and also on the amount of bromide ions present. This amount is readily determined by routine experimentation, with guidance having been given by the foregoing experimental examples. Levels of the hydantion or succinimide compounds are typically at least about 1 ppm, more preferably at least about 5 ppm, and up to about 100 ppm.

The present invention provides an enhanced method and system for treating water by the use of ozonization. The additives of the present invention may be readily used with existing ozonization systems. In addition, a bromide ion source and the hypobromite ion scavenger additive may be provided as an admixture of the two compounds that may be added to water presently being treated with ozone, alone. In one preferred embodiment the composition is suitably formulated as a combination of about equal parts by weight of the bromide ion source compound and a hydantion or succinimide. This composition is then added to the water to achieve the desired level of the two compounds.

It is also to be appreciated that the OBr⁻ scavenger and the Br⁻ ion may be provided as their precursors, preferably as a precursor to both components. In particular, compositions which react or hydrolyze in water to provide both Br⁻ ions and compounds possessing imide and/or amide functionality may be preferred. Examples of such compounds include: 1-bromo-3-chloro-5,5-dimethylhydantoin, 1-chloro-3-bromo-5,5-dimethylhydantoin, 1,3-dibromo-5,5-dimethylhydantoin, N-bromosuccinimide, mixtures of the salt of dichlorocyanuric acid and NaBr, mixtures of trichlorocyanuric acid and NaBr, and mixtures of any of the above.

While the invention has been illustrated and described in detail in the foregoing description, the same is to be considered as illustrative and not restrictive in character, it being understood that only the most preferred embodiments have been shown and described and that all changes and modifications that come within the spirit of the invention are desired to be protected.

What is claimed is:

1. A method for generating stable, residual disinfectants during the ozonization of water, comprising the step of carrying out the ozonization of water in the presence of bromide ions and an effective amount of a hypobromite ion scavenger possessing imide and/or amide functionality that preferentially converts hypobromite ions to biocidal, ozone-stable derivatives thereof to thereby suppress the catalytic decomposition reaction of ozone with hypobromite ions; wherein the presence of bromide ion is achieved by providing to the water a bromide ion precursor which reacts or hydrolyzes in water to provide bromide ion; and wherein the presence of hypobromite ion scavenger is achieved by providing to the water a hypobromite ion scavenger precursor which reacts or hydrolyzes in water to provide a hypobromite ion scavenger.

2. A method according to claim 1 wherein the presence of said bromide ions and the presence of said hypobromite ion scavenger are each achieved by providing to the water at least one compound selected from the group consisting of 1-bromo-3-chloro-5,5-dimethylhydantoin, 1-chloro-3-bromo-5,5-dimethylhydantoin, 1,3-dibromo-5,5-dimethylhydantoin, N-bromosuccinimide, mixtures of the salt of dichlorocyanuric acid and NaBr, mixtures of trichlorocyanuric acid and NaBr, and mixtures of any of the above.

3. A method according to claim 1 wherein the presence of said bromide ions and the presence of said hypobromite ion scavenger are each achieved by providing to the water a single precursor compound.

4. A method according to claim 1 wherein the presence of said bromide ions and the presence of said hypobromite ion scavenger are each achieved by providing to the water a compound selected from the group consisting of bromochlorodimethylhydantoin and dibromodimethylhydantoin.

5. A method according to claim 1 wherein the presence of said bromide ions and the presence of said hypobromite ion scavenger are each achieved by providing to the water at least two compounds selected from the group consisting of salts of dichlorocyanuric acid, salts of trichlorocyanuric acid and NaBr.

* * * * *

UNITED STATES PATENT AND TRADEMARK OFFICE
CERTIFICATE OF CORRECTION

PATENT NO : 5,888,428
DATED : March 30, 1999
INVENTOR(S) : Howarth et al.

It is certified that error appears in the above-identified patent and that said Letters Patent is hereby corrected as shown below:

In column 1, line 44, please change "ozonation" to --ozonization--.

In column 2, line 5 please change "hypobroinite" to --hypobromite--.

In column 2, line 14, please change "bropnate" to --bromate--.

In column 2, line 15, please change "tile" to --the--.

In column 3, line 12, please change "Ozonation" to --Ozonization--.

In column 4, line 1, please change "ozonation" to --ozonization--

In column 5, line 1, please change "OBr arid" to --OBr and--.

In column 7, line 47, please change "ozonation" to --ozonization--.

In column 10, line 3, please change "interception" to --intercepting--.

In column 10, line 29, please change "hydantion" to --hydantoin--.

Signed and Sealed this

Twenty-seventh Day of March, 2001

*Attest:*

NICHOLAS P. GODICI

*Attesting Officer*  Acting Director of the United States Patent and Trademark Office